US007805297B2

(12) United States Patent
Chen

(10) Patent No.: US 7,805,297 B2
(45) Date of Patent: Sep. 28, 2010

(54) CLASSIFICATION-BASED FRAME LOSS CONCEALMENT FOR AUDIO SIGNALS

(75) Inventor: Juin-Hwey Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1158 days.

(21) Appl. No.: 11/285,311

(22) Filed: Nov. 23, 2005

(65) Prior Publication Data

US 2007/0118369 A1 May 24, 2007

(51) Int. Cl.
*G10L 21/02* (2006.01)
*G10L 19/00* (2006.01)
*G10L 11/06* (2006.01)
*G10L 15/20* (2006.01)

(52) U.S. Cl. ....................... 704/228; 704/213; 704/214; 704/233

(58) Field of Classification Search ....................... None
See application file for complete search history.

(56) References Cited

U.S. PATENT DOCUMENTS

| | | | | |
|---|---|---|---|---|
| 6,735,567 B2 * | 5/2004 | Gao et al. | ................... | 704/258 |
| 6,901,362 B1 * | 5/2005 | Jiang et al. | .................. | 704/214 |
| 7,069,208 B2 * | 6/2006 | Wang | ......................... | 704/211 |
| 2003/0009325 A1 * | 1/2003 | Kirchherr et al. | ........... | 704/211 |
| 2004/0010407 A1 | 1/2004 | Kovesi et al. | | |
| 2006/0271373 A1 * | 11/2006 | Khalil et al. | ................ | 704/500 |

FOREIGN PATENT DOCUMENTS

EP 1 235 203 8/2002
EP 1 458 145 9/2004

OTHER PUBLICATIONS

Combescure et al., "A 16, 24, 32 kbit/s wideband speech codec based on ATCELP", IEEE International Conference on Acoustics, Speech, and Signal Processing, vol. 1, pp. 5-8, Mar. 15-19, 1999.*
Goodman et al., "Waveform Substitution Techniques for Recovering Missing Speech Segments in Packet Voice Communications", IEEE Transactions on Acoustics, Speech, and Signal Processing, vol. 34, No. 6, pp. 1440-1448, Dec. 1986.*
European Search Report issued Aug. 5, 2008 for Appl. No. EP 06015622, 3 pages.
Goodman, D.J. et al, "Waveform Substitution Techniques for Recovering Missing Speech Segments in Packet Voice Communications," IEEE, vol. 1, Apr. 7, 1986, pp. 105-108.

* cited by examiner

*Primary Examiner*—Brian L Albertalli
(74) *Attorney, Agent, or Firm*—Sterne, Kessler, Goldstein & Fox, P.L.L.C.

(57) ABSTRACT

A system and method for performing frame loss concealment (FLC) when portions of a bit stream representing an audio signal are lost within the context of a digital communication system. The system and method utilizes a plurality of different FLC techniques, wherein each technique is tuned or designed for a different kind of audio signal. When a frame is lost, a previously-decoded audio signal corresponding to one or more previously-received good frames is analyzed. Based on the result of the analysis, the FLC technique that is most likely to perform well for the previously-decoded audio signal is chosen to perform the FLC operation for the current lost frame. In one implementation, the plurality of different FLC techniques include an FLC technique designed for music, such as a frame repeat FLC technique, and an FLC technique designed for speech, such as a periodic waveform extrapolation (PWE) technique.

20 Claims, 7 Drawing Sheets

CLASSIFICATION-BASED FRAME LOSS CONCEALMENT FOR AUDIO SIGNALS

BACKGROUND OF THE INVENTION

1. Field of the Invention

The present invention relates to digital communication systems. More particularly, the present invention relates to the enhancement of audio quality when portions of a bit stream representing an audio signal are lost within the context of a digital communications system.

2. Background Art

In audio coding (sometimes called "audio compression"), a coder encodes an input audio signal into a compressed digital bit stream for transmission or storage, and a decoder decodes the transmitted or stored bit stream into an output audio signal. The combination of the coder and the decoder is called a codec. The compressed bit stream is usually partitioned into frames. When the decoder decodes the bit stream, certain frames of the compressed bit stream may be deemed "lost" and thus not available for the normal decoding operation. This frame loss may be due to late or dropped packets in a packet transmission system, or to severely corrupted frames in a wireless transmission system. Frame loss may even occur in audio storage applications for a variety of reasons.

When frame loss occurs, the decoder needs to perform special operations to try to conceal the quality-degrading effects of the lost frames; otherwise, the output audio quality may degrade severely. These special operations at the decoder have been given various names, such as "frame loss concealment (FLC)", "frame erasure concealment (FEC)", or "packet loss concealment (PLC)". These names are used interchangeably herein.

One of the simplest and most common FLC techniques consists of repeating the bit stream of the last good frame preceding the lost frame, and decoding the repeated bit stream normally as if it were the received bit stream for the lost frame. This scheme is commonly called the "Frame Repeat" method. If the audio codec uses instantaneous quantization such as Pulse Code Modulation (PCM) without any overlap-add operation, then the application of such a frame repeat method will generally cause waveform discontinuities at the frame boundaries, which will give rise to audible artifacts that sound like some sort of "clicks".

On the other hand, modern audio codecs typically perform frequency-domain transforms, such as Fast Fourier Transform (FFT) or Modified Discrete Cosine Transform (MDCT), and such transforms are typically performed on a windowed version of the input signal, wherein adjacent windows are to some extent overlapping. The corresponding audio decoders typically synthesize the output audio signals by using an overlap-add technique that is well-known in the art. With such modern audio codecs, the frame repeat FLC method generally will not cause waveform discontinuities at the frame boundaries, because the overlap-add operation gradually transitions between one piece of waveform and the next overlapping piece of waveform, thus smoothing out waveform discontinuities at the frame boundaries.

Even though the frame repeat method will not cause waveform discontinuities if it is used with audio codecs that employ overlap-add synthesis at the decoder, it can still result in audible distortion for certain types of audio signals, especially those signals that are nearly periodic, such as the vowels portions of speech signals (voiced speech). This is understandable since the waveform repeated at the frame rate is generally not aligned or "in phase" with the original input waveform in the lost frame. When the frame repeat method overlaps such two "out-of-phase" waveforms and adds them together, the resulting output signal usually includes some sort of audible disturbance that makes the output signal sound a little "busy" and not as "clean" as the original signal. Therefore, the frame repeat method generally performs poorly for nearly periodic signals such as voiced speech.

What is surprising is that when used with audio codecs employing overlap-add synthesis at the decoder (which include most of the modern audio codec standards), the frame repeat FLC method has been found to work surprisingly well for a large variety of audio signals that are "busy-sounding" and far from periodic. This is because for such busy-sounding audio signals, there is not a well-defined "phase", and the disturbance resulting from out-of-phase overlap-add is not nearly as pronounced as in the case of nearly periodic signals. Any residual "disturbance" in the output audio signal is probably "buried" by the busy sounds in the audio signal anyway. For such audio signals, perceptually it is actually quite difficult to detect the distortion caused by the frame repeat FLC method.

In contrast to the simple frame repeat FLC method, at the other extreme there is another class of FLC methods that use sophisticated signal processing algorithms to try to extrapolate waveforms based on previously-received good frames to fill the waveform gaps corresponding to the lost frames. Many of these FLC methods perform periodic waveform extrapolation (PWE) when the decoded waveform corresponding to the good frames that preceded the current lost frame is deemed to be roughly periodic. For non-periodic signals these methods use various kinds of other techniques to extrapolate the waveform. Examples of this class of PWE-based FLC methods include, but are not limited to, the method proposed by Goodman, et al. in "Waveform Substitution Techniques for Recovering Missing Speech Segments in Packet Voice Communications", *IEEE Transaction on Acoustics, Speech and Signal Processing*, December 1986, pp. 1440-1448, the PLC method of ITU-T Recommendation G.711 Appendix I developed by D. Kapilow, and the method developed by J.-H. Chen as described in U.S. patent application Ser. No. 11/234,291, filed Sep. 26, 2005 and entitled "Packet Loss Concealment for Block-Independent Speech Codecs". The entirety of each of these documents is incorporated by reference herein in its entirety.

This class of PWE-based FLC methods is usually tuned for speech signals, and thus these methods usually work quite well for speech. However, when applied to general audio signals such as music, while they still work, these methods tend to have more problems and audible distortion. One of the most common problems is that for busy-sounding music signals, the periodic waveform extrapolation of these techniques often causes some "buzz" sounds, because the periodically extrapolated waveform is more periodic than the original waveform corresponding to the lost frames.

To summarize, when used with audio codecs employing overlap-add synthesis in the decoder, the frame repeat FLC method works well for most music signals but performs poorly for speech. On the other hand, PWE-based FLC methods work well for speech but often produce an audible "buzz" for busy, non-periodic music signals. However, in many applications, such as the sound tracks in movie, television, and radio programs, the audio signal frequently changes between pure speech, pure music, and speech in music. In this case, using either frame repeat or PWE-based FLC methods will have performance problems at least for some portions of the audio signal.

What is needed therefore is an FLC technique that works well at least for both speech and music. Ideally, the desired FLC method should be "universal" such that it works well for any kind of audio signal, but at the very least, the desired FLC method should work well for both speech and music, since speech and music are the dominant types of audio signals in sound tracks for movie, TV, and radio. The present invention addresses this problem and can achieve good performance for both speech and music signals.

SUMMARY OF THE INVENTION

In the most general form of the present invention, an audio decoding system employs a plurality of different FLC methods, wherein each method is designed to perform well for a different kind of audio signal. When a frame is deemed lost, the audio decoding system analyzes a previously-decoded audio signal corresponding to previously-decoded frames of an audio bit-stream. Based on the results of the analysis, the audio decoding system selects the one of the plurality of different FLC methods that is most likely to perform well for the previously-decoded audio signal to perform the FLC operation for the lost frame.

In an exemplary embodiment of the present invention, an FLC method designed for music, such as a frame repeat FLC method, and an FLC method designed for speech, such as a PWE-based FLC method, are employed. When a frame is deemed lost, the audio decoding system analyzes a previously-decoded audio signal corresponding to previously-decoded frames of an audio bit-stream. If the previously-decoded audio signal is classified as a speech signal, the FLC method designed for speech is chosen to perform the FLC operations, while if the previously-decoded audio signal is classified as a music signal, the FLC method designed for music is chosen to perform the FLC operations. Alternatively or additionally, if the previously-decoded audio exhibits a sufficient degree of periodicity, the FLC method designed for speech is chosen and if the previously-decoded audio signal does not exhibit a sufficient degree of periodicity, then the FLC method designed for music is chosen. In this way, this adaptively switched FLC system will achieve the best of both worlds and perform reasonably well for both speech and music signals.

BRIEF DESCRIPTION OF THE DRAWINGS/FIGURES

The accompanying drawings, which are incorporated herein and form a part of the specification, illustrate one or more embodiments of the present invention and, together with the description, further serve to explain the purpose, advantages, and principles of the invention and to enable a person skilled in the art to make and use the invention.

The features and advantages of the present invention will become more apparent from the detailed description set forth below when taken in conjunction with the drawings. The drawing in which an element first appears is indicated by the leftmost digit(s) in the corresponding reference number.

DETAILED DESCRIPTION OF INVENTION

Figure 1:
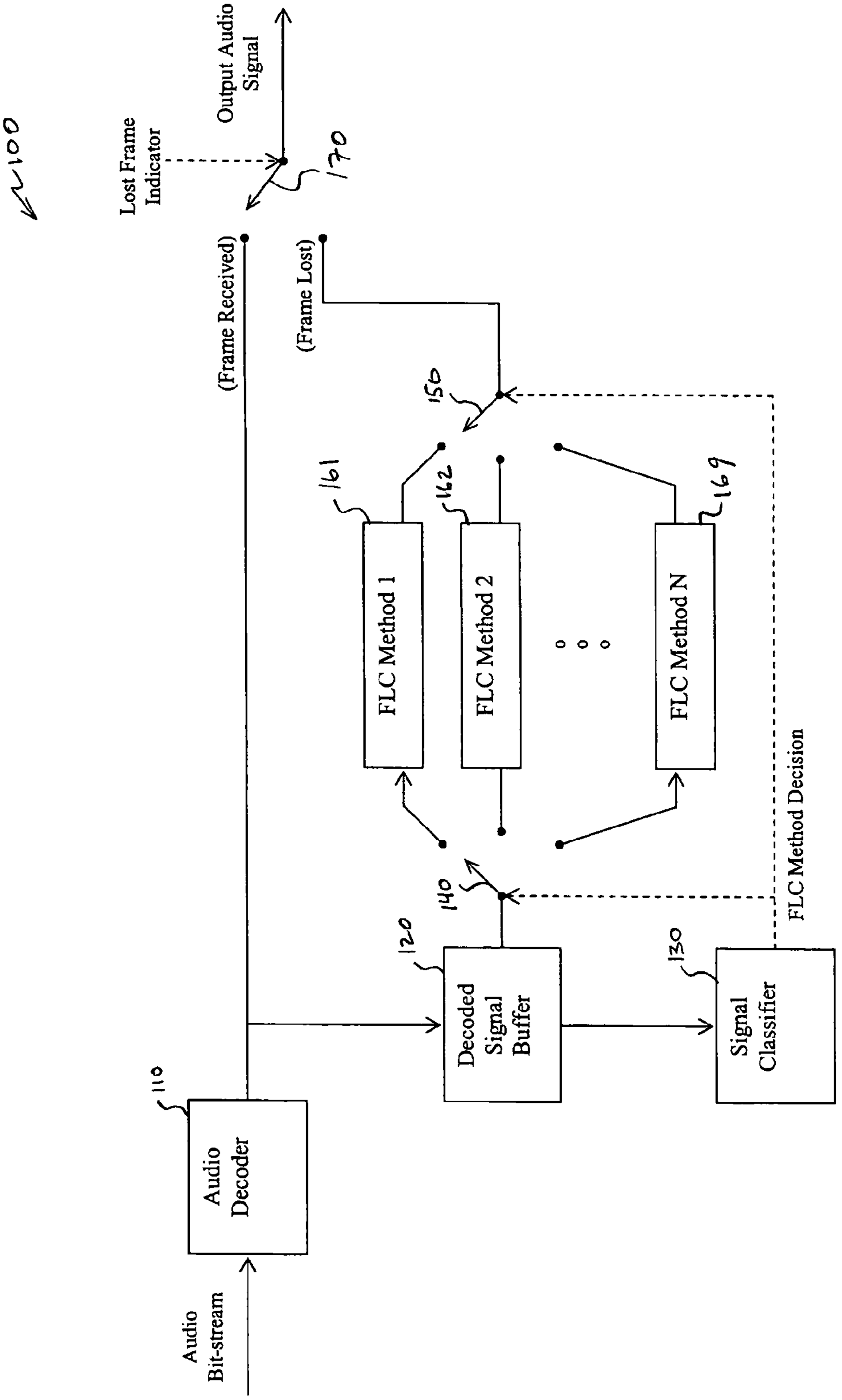
FIG. 1 illustrates an audio decoding system that performs generalized classification-based frame loss concealment (FLC) in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the present invention. Therefore, the following detailed description is not meant to limit the invention. Rather, the scope of the invention is defined by the appended claims.

It would be apparent to persons skilled in the art that the present invention, as described below, may be implemented in many different embodiments of hardware, software, firmware, and/or the entities illustrated in the drawings. Any actual software code with specialized control hardware to implement the present invention is not limiting of the present invention. Thus, the operation and behavior of the present invention will be described with the understanding that modifications and variations of the embodiments are possible, given the level of detail presented herein.

A. GENERALIZED CLASSIFICATION-BASED FLC SYSTEM AND METHOD IN ACCORDANCE WITH AN EMBODIMENT OF THE PRESENT INVENTION

FIG. 1 illustrates an audio decoding system 100 that performs generalized classification-based frame loss concealment (FLC) in accordance with an embodiment of the present invention. As shown in FIG. 1, audio decoding system 100 includes an audio decoder 110, a decoded signal buffer 120, a signal classifier 130, first and second FLC method selection switches 140 and 150, a plurality of FLC processing blocks 161 through 169, and an output signal selection switch 170. As will be appreciated by persons skilled in the relevant art(s), each of the elements of system 100 may be implemented in software, in hardware, or as a combination of software and hardware.

As a whole, audio decoding system 100 operates to decode each of a series of frames of an input audio bit-stream into corresponding frames of decoded audio signal samples. System 100 decodes the audio bit-stream one frame at a time. As used herein, the term "current frame" refers to the frame of the audio bit-stream that system 100 is currently decoding, whereas "previous frame" refers to a frame of the audio bit-stream that system 100 has already decoded. As used herein, the term "decoding" may include both normal decoding of a received frame of the audio bit-stream into corresponding audio signal samples as well as generating audio signal samples for a lost frame of the audio bit-stream using an FLC technique. The function of each of the components of system 100 will now be described in more detail.

If a current frame of the audio bit-stream is deemed received, audio decoder 110 decodes the current frame into corresponding audio signal samples. Output signal selection switch 170 is controlled by a lost frame indicator, which is generated by system 100 depending on whether the current frame of the audio bit-stream is deemed received or is lost. If the current frame is deemed received, switch 170 is placed in the upper position, connected to the node labeled "(Frame Received)", and the normally-decoded audio signal at the output of audio decoder 110 is used as the output audio signal for the current frame. Furthermore, the decoded audio signal for the current frame is also stored in decoded signal buffer 120 in preparation for possible FLC operations for future frames.

In contrast, if the current frame of the audio bit-stream is deemed lost, then output signal selection switch 170 is placed in the lower position, connected to the node labeled "(Frame Lost)". In this case, signal classifier 130 analyzes the previously-decoded audio signal stored in decoded signal buffer 120, or a portion thereof, to select one of the N possible FLC methods to perform the FLC operations. This previously decoded-audio signal corresponds to the received frames before the current lost frame.

As shown in FIG. 1, there are N possible FLC methods that audio decoding system 100 can use. These N possible FLC methods are labeled as blocks 161 through 169 in FIG. 1. Each of these N possible FLC methods is designed or tuned for a particular kind or class of audio signal exhibiting certain signal properties. Ideally, these N possible FLC methods should cover all possible kinds of audio signals. In other words, given any arbitrary audio signal, at least one of the N possible FLC methods should be able to conceal the effects of a lost frame with reasonably good performance.

The function of signal classifier 130 is to analyze the previously-decoded audio signal stored in decoded signal buffer 120, or a portion thereof, in order to identify which of the N possible FLC methods is most suitable for performing the FLC operations for the kind of audio signal stored in decoded signal buffer 120. As shown in FIG. 1, the resulting FLC Method Decision then controls the two linked (synchronized) FLC method selection switches 140 and 150 so that the most suitable FLC method for the stored audio signal is selected to process the stored audio signal in order to generate the output audio signal for the current lost frame.

In the particular example shown in FIG. 1, switches 140 and 150 are in the uppermost position so that the FLC method 1 is selected. Of course, this is just an example. For a different frame that is lost, signal classifier 130 may select a different FLC method. In general, signal classifier 130 may dynamically select any of the N possible FLC methods for any given lost frame in an audio signal. This is consistent with the example given above for movie or television sound tracks, wherein the audio signal may frequently change between pure speech, pure music, speech in music, and other sound effects.

Once a particular FLC method (for example, FLC method 1 in FIG. 1) is selected, this FLC method takes the previously-decoded audio signal, or some portion thereof, stored in decoded signal buffer 120 and performs the associated FLC operations. The resulting output signal is then routed through switches 150 and 170 and becomes the output audio signal for the audio decoding system 100. Note that although it is not depicted in FIG. 1 for the sake of simplicity, it is understood and generally advisable that the FLC output signal picked up by switch 150 is also passed back to decoded signal buffer 120 so that the audio signal produced by the selected FLC method for the current lost frame is also stored as the newest portion of the "previously-decoded audio signal". This is done to prepare decoded signal buffer 120 for the next frame in case the next frame is also lost. In other words, it is generally advantageous for decoded signal buffer 120 to store the audio signal corresponding to the last frame immediately processed before a lost frame, whether or not the audio signal was produced by audio decoder 110 or one of FLC processing blocks 161 through 169.

Figure 2:
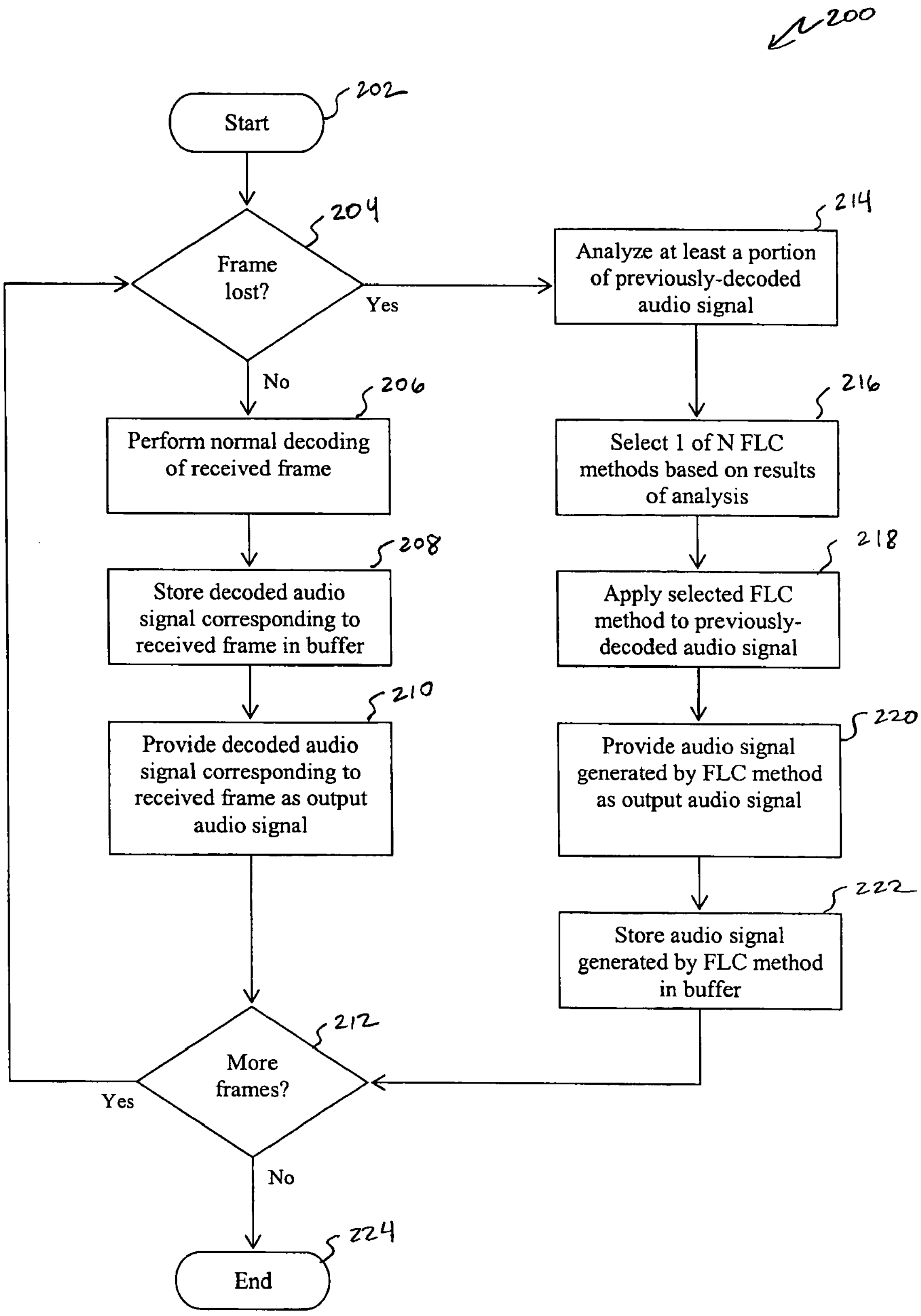
FIG. 2 illustrates a flowchart of a method for performing generalized classification-based FLC in an audio decoding system in accordance with an embodiment of the present invention.

FIG. 2 illustrates a flowchart 200 of a method for performing classification-based FLC in an audio decoding system in accordance with an embodiment of the present invention. The method of flowchart 200 will be described with continuing reference to audio decoding system 100 of FIG. 1, although persons skilled in the relevant art(s) will appreciate that the invention is not limited to that implementation.

As shown in FIG. 2, the beginning of flowchart 200 is indicated by an element 202 labeled "start". Processing immediately proceeds to step 204, in which a decision is made as to whether the next frame of the input audio bit-stream to be received by audio decoder 110 is received or lost. If the frame is deemed received, then audio decoder 110 performs normal decoding operations on the received frame to generate corresponding decoded audio signal samples, as shown at step 206. Processing then proceeds to step 208 in which the decoded audio signal corresponding to the received frame is stored in decoded signal buffer 120. The decoded audio signal is also provided as the output audio signal of audio decoding system 100, as shown at step 210. With reference to FIG. 1, this is achieved through the operation of output signal selection switch 170 (under the control of the lost frame indicator) to couple the output of audio decoder 110 to the ultimate output of system 100. Processing then proceeds to step 212, where it is determined whether or not there are more frames in the audio bit-stream to be processed by audio decoding system 100. If there are more frames, then processing returns to decision step 204; otherwise, processing ends as denoted by element 224 labeled "end".

Returning to decision step 204, if it is determined that the next frame in the input audio bit-stream is lost, then processing proceeds to step 214, in which signal classifier 130 analyzes at least a portion of the previously decoded audio signal stored in decoded signal buffer 120. Based on this analysis, signal classifier 130 selects one of N FLC methods as the most suitable for performing FLC operations for the class of audio signal stored in decoded signal buffer 120, as shown at step 216. With reference to FIG. 1, this selection is performed via the generation of FLC Method Decision by signal classifier 130, which controls FLC method selection switches 140 and 150 to select one of the plurality of FLC processing blocks 161 through 169. Processing then proceeds to step 218, in which the selected FLC method is applied to the previously-decoded audio signal, or a portion thereof, stored in decoded signal buffer 120. The audio signal generated by application of the selected FLC method is then provided as the output audio signal of audio decoding system 100, as shown at step 220. In the implementation shown in FIG. 1, this is achieved through the operation of output signal selection switch 170 (under the control of the lost frame indicator) to couple the output at switch 150 to the ultimate output of system 100. The audio signal generated by application of the selected FLC method is also stored in decoded signal buffer 120 as shown in step 222. Processing then proceeds to step 212, where it is determined whether or not there are more frames in the audio bit-stream to be processed by audio decoding system 100. If there are more frames, then processing returns to decision step 204; otherwise, processing ends as denoted by element 224 labeled "end".

B. CLASSIFICATION-BASED FLC SYSTEM AND METHOD USING TWO FLC METHODS IN ACCORDANCE WITH AN EMBODIMENT OF THE PRESENT INVENTION

Figure 3:
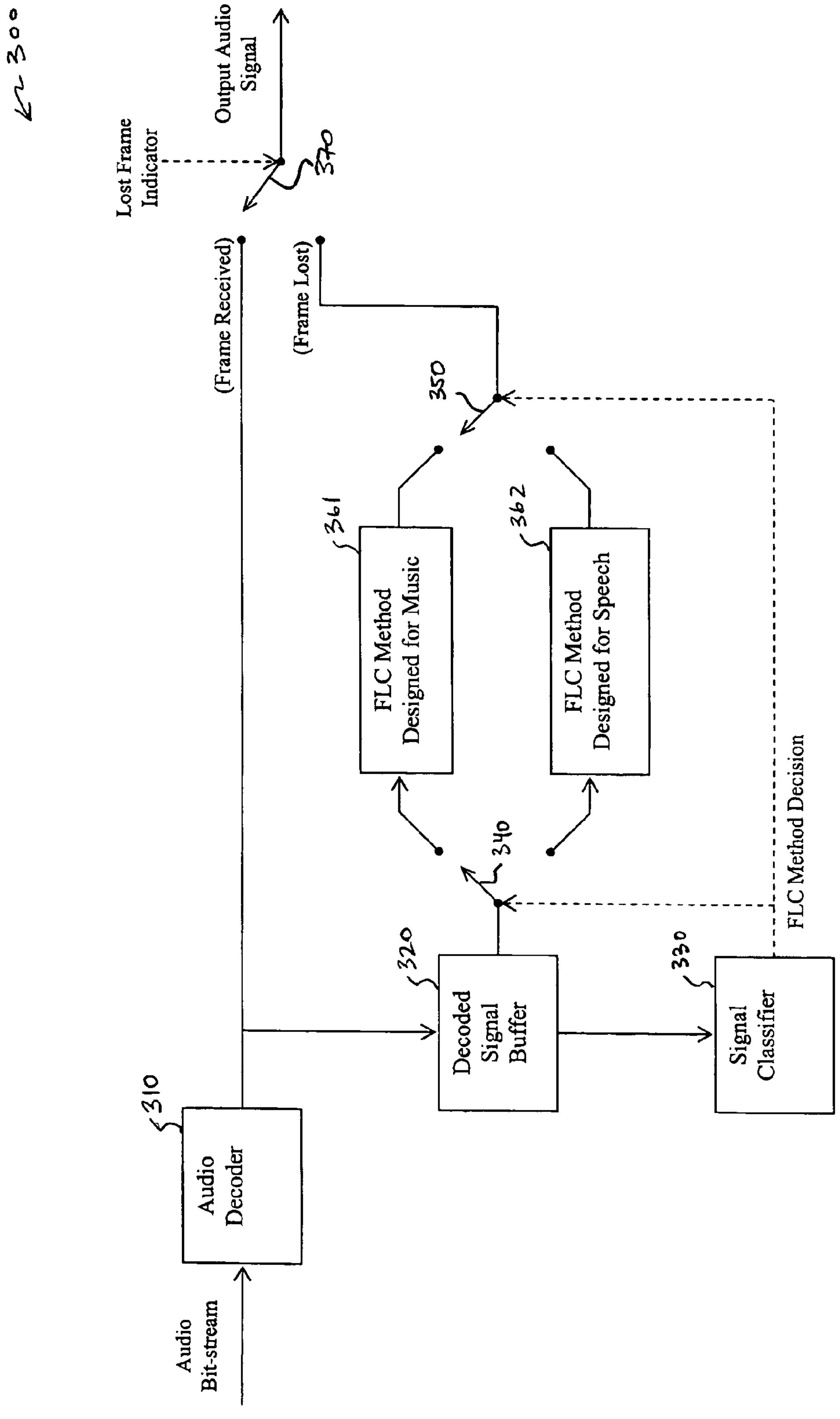
FIG. 3 illustrates an audio decoding system that performs classification-based FLC using two FLC methods in accordance with an embodiment of the present invention.

FIG. 3 illustrates an audio decoding system 300 that performs classification-based FLC using two FLC methods in accordance with an embodiment of the present invention. System 300 is basically a special case of system 100 of FIG. 1 with N=2. Consequently, much of the foregoing description of system 100 applies to system 300 as well and will not be repeated. Rather, the following description will concentrate on the two particular FLC methods supported by system 300: an FLC method designed for music signals, such as a frame repeat FLC method, and an FLC method designed for speech signals, such as a periodic-waveform-extrapolation-based FLC method.

The frame repeat method has been described in the background art section. Three examples of the PWE-based FLC method optimized for speech have also been described in that same section (the methods by Goodman et al., by D. Kapilow, and by J.-H. Chen) and documents describing these methods have been incorporated by reference herein. However, these examples are not intended to be limiting. Persons skilled in the relevant art(s) will readily appreciate that a variety of other frame repeat and PWE-based FLC methods may be used while remaining within the scope and spirit of the present invention.

Furthermore, the invention is not limited to the use of a frame repeat FLC method for music. Rather, any FLC method designed for music can be used. Likewise, the invention is not limited to the use of a PWE-based FLC method for speech and any other FLC method designed for speech can be used instead.

Signal classifier 330 of FIG. 3 operates to analyze at least a portion of the decoded audio signal stored in decoded signal buffer 320 and, based on the results of the analysis, to select either a first FLC processing block 361 or a second FLC processing block 362 for application of an FLC method to the decoded audio signal, or a portion thereof. First FLC processing block 361 applies an FLC method designed for music, such as a frame repeat FLC method, while second FLC processing block 362 applies an FLC method designed for speech, such as a PWE-based FLC method. The manner in which signal classifier 330 analyzes and classifies the decoded audio signal will now be described.

In one embodiment, signal classifier 330 comprises a speech/music classifier that determines whether the previously-decoded audio signal is speech or music on a frame-by-frame basis. A person skilled in the art will appreciate that there are many speech/music classifiers (sometimes called "discriminators") proposed in the literature. As such, a particular implementation of a speech/music classifier will not be described. If signal classifier 330 determines that the previously-decoded audio signal stored in the decoded signal buffer 320 is music, then the FLC method of processing block 361 is selected to perform the FLC operations. On the other hand, if signal classifier 330 determines that the previously-decoded audio signal is speech, then the FLC method of processing block 362 is selected to perform the FLC operations.

The foregoing represents a simple approach to classifying the previously-decoded audio signal. In reality, however, there are certain music signals that exhibit a high degree of periodicity, such as voice-dominated singing or solo instruments such as trumpet, saxophone, and the like. In this case, an FLC method designed for speech, such as a PWE-based FLC method, is likely to outperform an FLC method designed for music, such as a frame repeat FLC method. Therefore, in an alternate embodiment, signal classifier 330 examines the degree of periodicity in the previously-decoded audio signal in addition to (or as an alternative to) determining whether the previously-decoded audio signal is likely to be music or speech. If the degree of periodicity is sufficiently high, signal classifier 330 selects the FLC method designed for speech, even if the previously-decoded audio signal has been deemed to be music rather than speech. For example, in an embodiment, signal classifier 330 compares a measure of periodicity of the previously-decoded audio signal to a predefined threshold, and if the measure of periodicity exceeds the threshold, then signal classifier 330 selects the FLC method designed for speech.

For general audio signals, with proper implementation, audio decoding system 300 shown in FIG. 3 should perform better than either an FLC method designed for music (e.g., a frame repeat FLC method) or an FLC method designed for speech (e.g., a PWE-based FLC method) alone. In other words, audio decoding system 300 is more "universal" than either of the two FLC methods that it employs. Thus, it represents an improvement over existing prior art audio decoding systems that use only an FLC method designed for music or an FLC method designed for speech.

Figure 4:
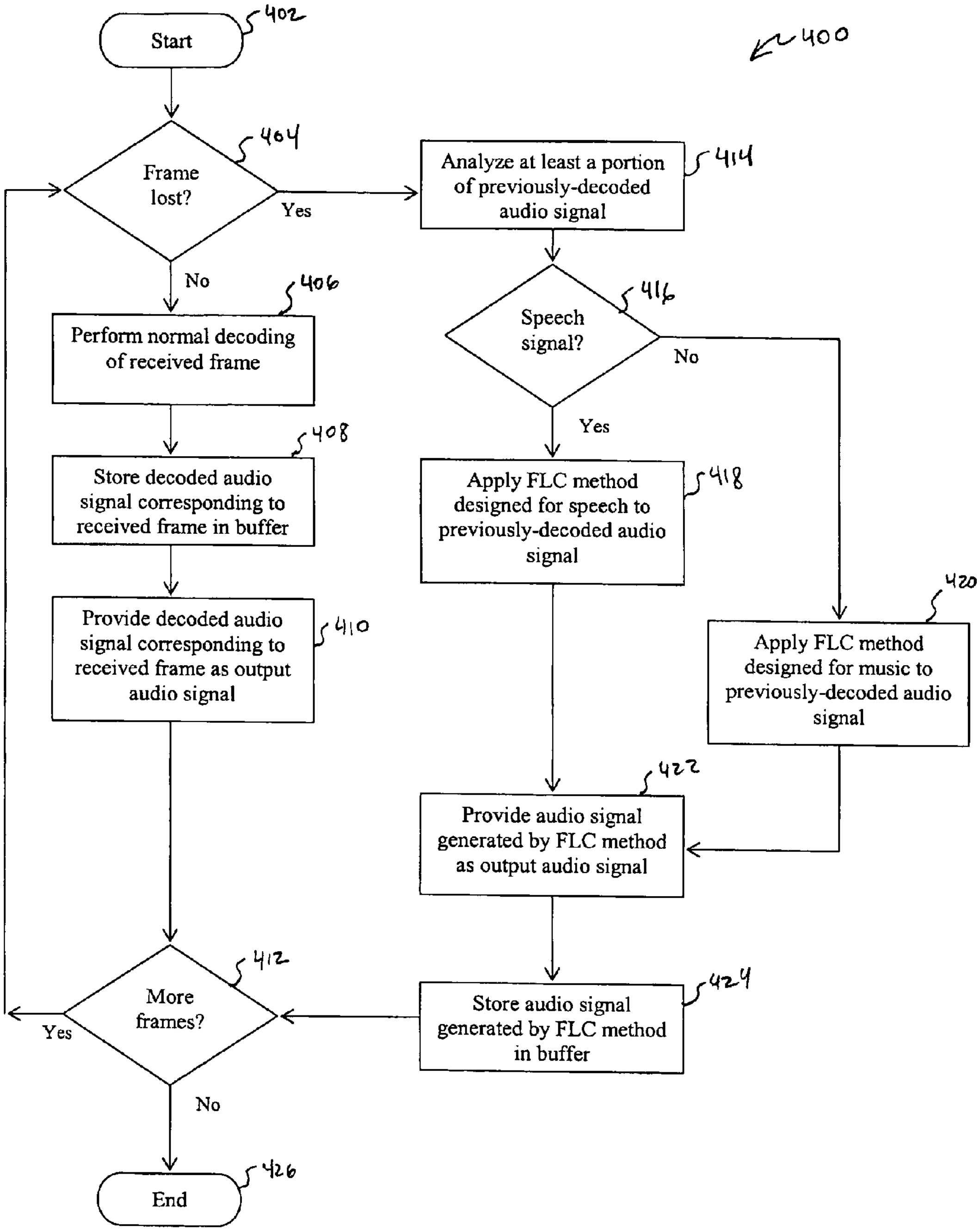
FIG. 4 illustrates a flowchart of a first method for performing classification-based FLC in an audio decoding system that supports two FLC methods in accordance with an embodiment of the present invention.

FIG. 4 illustrates a flowchart 400 of a method for performing classification-based FLC in an audio decoding system that supports two FLC methods in accordance with an embodiment of the present invention. The method of flowchart 400 will be described with continuing reference to audio decoding system 300 of FIG. 3, although persons skilled in the relevant art(s) will appreciate that the invention is not limited to that implementation.

As shown in FIG. 4, the beginning of flowchart 400 is indicated by an element 402 labeled "start". Processing immediately proceeds to step 404, in which a decision is made as to whether the next frame of the input audio bit-stream to be received by audio decoder 310 is received or lost. If the frame is deemed received, then audio decoder 310 performs normal decoding operations on the received frame to generate corresponding decoded audio signal samples, as shown at step 406. Processing then proceeds to step 408 in which the decoded audio signal corresponding to the received frame is stored in decoded signal buffer 320. The decoded audio signal is also provided as the output audio signal of audio decoding system 300, as shown at step 410. With reference to FIG. 3, this is achieved through the operation of output signal selection switch 370 (under the control of the lost frame indicator) to couple the output of audio decoder 310 to the ultimate output of system 300. Processing then proceeds to step 412, where it is determined whether or not there are more frames in the audio bit-stream to be processed by audio decoding system 300. If there are more frames, then processing returns to decision step 404; otherwise, processing ends as denoted by element 426 labeled "end".

Returning to decision step 404, if it is determined that the next frame in the input audio bit-stream is lost, then processing proceeds to step 414, in which signal classifier 330 analyzes at least a portion of the previously-decoded audio signal stored in decoded signal buffer 320. Based on this analysis, signal classifier 330 determines whether or not the previously-decoded audio signal is a speech signal or a music signal, as denoted by decision step 416. If the previously-decoded audio signal is determined to be a speech signal, signal classifier 330 selects an FLC method designed for speech, such as a PWE-based FLC method, to perform FLC operations on the previously-decoded audio signal stored in decoded signal buffer 120, as shown at step 418. With reference to FIG. 3, this selection is performed via the generation of FLC Method Decision by signal classifier 330, which controls FLC method selection switches 340 and 350 to select FLC processing block 362.

However, if the previously-decoded audio signal is determined to be non-speech (for example, a music signal), signal classifier 330 instead selects an FLC method designed for music, such as a frame repeat FLC method, to perform FLC operations on the previously-decoded audio signal, or a portion thereof, stored in decoded signal buffer 320, as shown at step 420. With reference to FIG. 3, this selection is performed via the generation of FLC Method Decision by signal classifier 330, which controls FLC method selection switches 340 and 350 to select FLC processing block 361.

Regardless of whether an FLC method designed for speech is applied in step 418 or an FLC method designed for music is applied in step 420, at step 422 the audio signal generated by the selected FLC method is provided as the output audio signal of audio decoding system 300. In the implementation shown in FIG. 3, this is achieved through the operation of output signal selection switch 370 (under the control of the lost frame indicator) to couple the output at switch 350 to the ultimate output of system 300. As shown at step 424, the audio signal generated by application of the selected FLC method is also stored in decoded signal buffer 120. Processing then proceeds to step 412, where it is determined whether or not there are more frames in the audio bit-stream to be processed by audio decoding system 300. If there are more frames, then processing returns to decision step 404; otherwise, processing ends as denoted by element 426 labeled "end".

Figure 5:
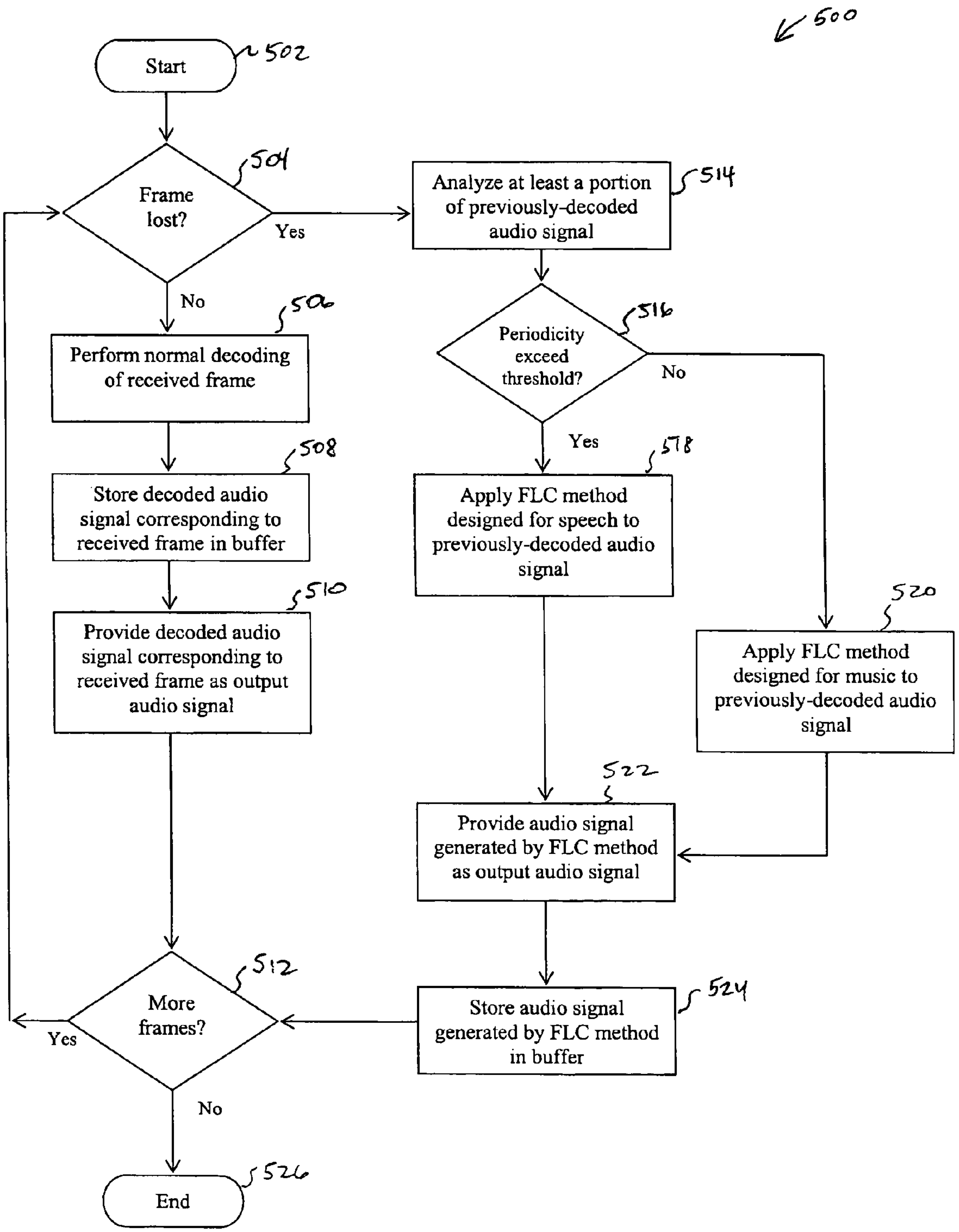
FIG. 5 illustrates a flowchart of a second method for performing classification-based FLC in an audio decoding system that supports two FLC methods in accordance with an embodiment of the present invention.

FIG. 5 illustrates a flowchart 500 of an alternative method for performing classification-based FLC in an audio decoding system that supports two FLC methods in accordance with an embodiment of the present invention. The method steps of flowchart 500 are essentially the same as those of flowchart 400 except that decision step 416 has been replaced by a different decision step 516. In decision step 516, signal classifier 330 compares a measure of the periodicity of the previously-decoded audio signal to a predefined threshold. If the measure periodicity exceeds the threshold, then signal classifier 330 selects the FLC method designed for speech to perform FLC operations on the previously-decoded audio signal, or a portion thereof, stored in decoded signal buffer 320. However, if the measure periodicity does not exceed this threshold, then signal classifier 330 selects the FLC method designed for music to perform FLC operations on the previously-decoded audio signal, or a portion thereof, stored in decoded signal buffer 320.

Figure 6:
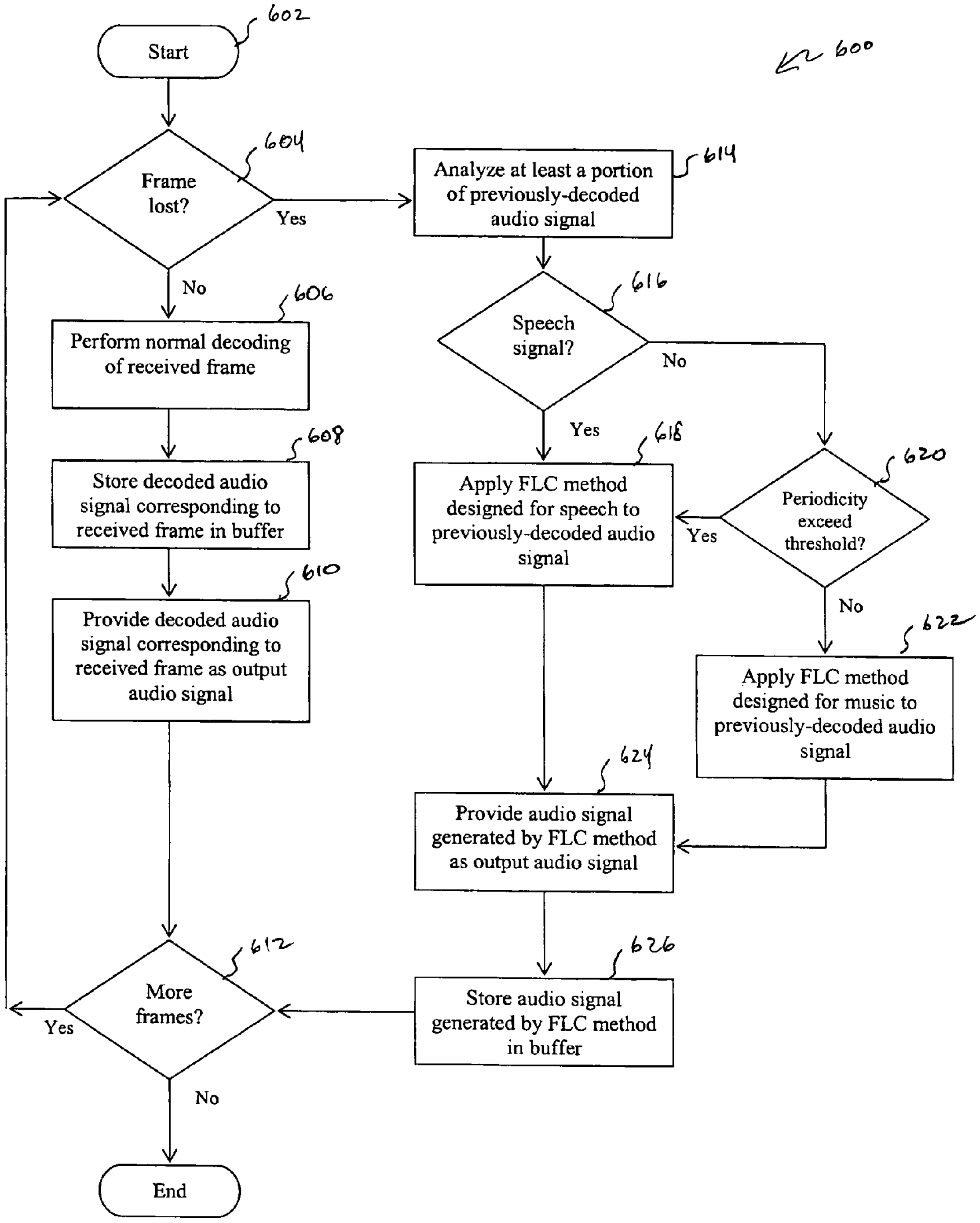
FIG. 6 illustrates a flowchart of a third method for performing classification-based FLC in an audio decoding system that supports two FLC methods in accordance with an embodiment of the present invention.

FIG. 6 illustrates a flowchart 600 of yet another alternative method for performing classification-based FLC in an audio decoding system that supports two FLC methods in accordance with an embodiment of the present invention. Flowchart 600 includes essentially the same method steps as flowchart 400 and flowchart 500 except that it includes both a first decision step 616 that is analogous to decision step 416 and a second decision step 620 that is analogous to decision step 516. Thus, in accordance with flowchart 600, signal classifier 330 analyzes at least a portion of a previously-decoded audio signal to determine if it is a speech signal or a music signal. In accordance with decision step 616, if the previously-decoded audio signal is determined to be a speech signal, signal classifier 330 selects the FLC method designed for speech to perform FLC operations on the previously-decoded audio signal stored in decoded signal buffer 320, as shown at step 618.

However, if the previously-decoded audio signal is determined to be non-speech (in other words, a music signal), processing instead proceeds to step 620, in which signal classifier 330 compares a measure of the periodicity of the previously-decoded audio signal to a predefined threshold. If the measured periodicity exceeds the threshold, then signal classifier 330 selects the FLC method designed for speech to perform FLC operations on the previously-decoded audio signal, or a portion thereof, stored in decoded signal buffer 320, as shown by the arrow extending to processing step 618. However, if the measured periodicity does not exceed this threshold, then signal classifier 330 selects the FLC method designed for music to perform FLC operations on the previously-decoded audio signal, or a portion thereof, stored in decoded signal buffer 320, as shown at step 622.

C. HARDWARE AND SOFTWARE IMPLEMENTATIONS

Figure 7:
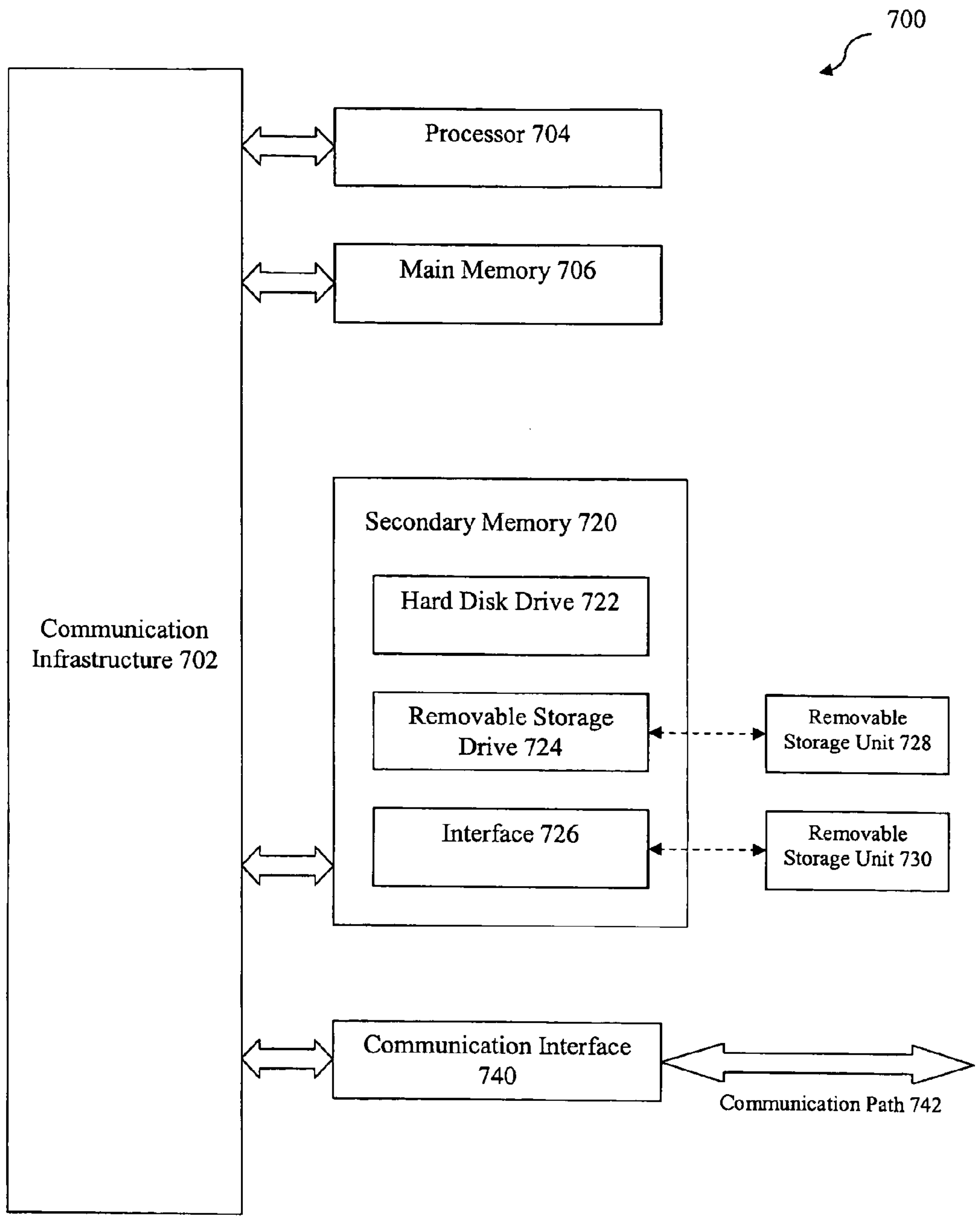
FIG. 7 depicts an example computer system in which the present invention may be implemented.

The following description of a general purpose computer system is provided for the sake of completeness. The present invention can be implemented in hardware, or as a combination of software and hardware. Consequently, the invention may be implemented in the environment of a computer system or other processing system. An example of such a computer system 700 is shown in FIG. 7. In the present invention, all of the processing blocks or steps of FIGS. 1-6, for example, can execute on one or more distinct computer systems 700, to implement the various methods of the present invention. The computer system 700 includes one or more processors, such as processor 704. Processor 704 can be a special purpose or a general purpose digital signal processor. The processor 704 is connected to a communication infrastructure 702 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 706, preferably random access memory (RAM), and may also include a secondary memory 720. The secondary memory 720 may include, for example, a hard disk drive 722 and/or a removable storage drive 724, representing a floppy disk drive, a magnetic tape drive, an optical disk drive, or the like. The removable storage drive 724 reads from and/or writes to a removable storage unit 728 in a well known manner. Removable storage unit 728 represents a floppy disk, magnetic tape, optical disk, or the like, which is read by and written to by removable storage drive 724. As will be appreciated, the removable storage unit 728 includes a computer usable storage medium having stored therein computer software and/or data.

In alternative implementations, secondary memory 720 may include other similar means for allowing computer programs or other instructions to be loaded into computer system 700. Such means may include, for example, a removable storage unit 730 and an interface 726. Examples of such means may include a program cartridge and cartridge interface (such as that found in video game devices), a removable memory chip (such as an EPROM, or PROM) and associated socket, and other removable storage units 730 and interfaces 726 which allow software and data to be transferred from the removable storage unit 730 to computer system 700.

Computer system 700 may also include a communications interface 740. Communications interface 740 allows software and data to be transferred between computer system 700 and external devices. Examples of communications interface 740 may include a modem, a network interface (such as an Ethernet card), a communications port, a PCMCIA slot and card, etc. Software and data transferred via communications interface 740 are in the form of signals which may be electronic, electromagnetic, optical, or other signals capable of being received by communications interface 740. These signals are provided to communications interface 740 via a communications path 742. Communications path 742 carries signals and may be implemented using wire or cable, fiber optics, a phone line, a cellular phone link, an RF link and other communications channels.

As used herein, the terms "computer program medium" and "computer usable medium" are used to generally refer to media such as removable storage units 728 and 730, a hard disk installed in hard disk drive 722, and signals received by communications interface 740. These computer program products are means for providing software to computer system 700.

Computer programs (also called computer control logic) are stored in main memory 706 and/or secondary memory 720. Computer programs may also be received via communications interface 740. Such computer programs, when executed, enable the computer system 700 to implement the present invention as discussed herein. In particular, the computer programs, when executed, enable the processor 700 to implement the processes of the present invention, such as the methods described with reference to FIGS. 2, 4, 5 and 6, for example. Accordingly, such computer programs represent controllers of the computer system 700. Where the invention is implemented using software, the software may be stored in a computer program product and loaded into computer system 700 using removable storage drive 724, interface 726, or communications interface 740.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

D. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method, performed in an audio decoding system, for generating an output audio signal corresponding to a lost frame of an audio bit-stream, comprising:

analyzing at least a portion of a previously-decoded audio signal corresponding to previously-decoded frames of the audio bit-stream to determine if a periodicity measure associated with the previously-decoded audio signal exceeds a predefined threshold;

selecting one of a plurality of frame loss concealment (FLC) techniques based on the results of the analysis; and applying the selected one of the plurality of FLC techniques to the previously-decoded audio signal to generate the output audio signal corresponding to the lost frame.

2. The method of claim 1, wherein analyzing at least a portion of a previously-decoded audio signal comprises determining if the previously-decoded audio signal is speech or music.

3. The method of claim 1, wherein selecting one of a plurality of FLC techniques based on the results of the analysis comprises selecting an FLC technique designed for music.

4. The method of claim 3, wherein selecting an FLC technique designed for music comprises selecting a frame repeat FLC technique.

5. The method of claim 1, wherein selecting one of a plurality of FLC techniques based on the results of the analysis comprises selecting an FLC technique designed for speech.

6. The method of claim 5, wherein selecting an FLC technique designed for speech comprises selecting a periodic waveform extrapolation (PWE) based FLC technique.

7. The method of claim 1, wherein the analyzing step is performed by a plurality of processing blocks implemented in hardware.

8. An audio decoding system, comprising:

a decoded signal buffer implemented in memory and configured to store a previously-decoded audio signal corresponding to previously-decoded frames of an audio bit-stream;

a plurality of processing blocks coupled to the decoded signal buffer, each of the plurality of processing blocks configured to perform a corresponding frame loss concealment (FLC) technique;

a signal classifier coupled to the decoded signal buffer and the plurality of processing blocks, the signal classifier configured to analyze at least a portion of the previously-decoded audio signal stored in the decoded signal buffer to determine if a periodicity measure associated with the previously-decoded audio signal exceeds a predefined threshold and, based on the results of the analysis, to select one of the plurality of processing blocks to perform FLC operations on the previously-decoded audio signal, thereby generating an output audio signal corresponding to a lost frame of the audio bit-stream.

9. The audio decoding system of claim 8, wherein the signal classifier is configured to determine if the previously-decoded audio signal is speech or music.

10. The audio decoding system of claim 8, wherein one of the plurality of processing blocks is configured to perform an FLC technique designed for music.

11. The audio decoding system of claim 10, wherein the one of the plurality of processing blocks configured to perform an FLC technique designed for music is configured to perform a frame repeat FLC technique.

12. The audio decoding system of claim 8, wherein one of the plurality of processing blocks is configured to perform an FLC technique designed for speech.

13. The audio decoding system of claim 12, wherein the one of the plurality of processing blocks configured to perform an FLC technique designed for speech is configured to perform a periodic waveform extrapolation (PWE) based FLC technique.

14. The audio decoding system of claim 8, wherein the processing blocks are implemented in hardware.

15. A computer program product comprising a computer useable storage medium having computer program logic recorded thereon for enabling a processor in a computer system to generate an output audio signal corresponding to a lost frame of an audio bit-stream, comprising:

first means for enabling the processor to analyze at least a portion of a previously-decoded audio signal corresponding to previously-decoded frames of the audio bit-stream to determine if a periodicity measure associated with the previously-decoded audio signal exceeds a predefined threshold;

second means for enabling the processor to select one of a plurality of frame loss concealment (FLC) techniques based on the results of the analysis; and third means for enabling the processor to apply the selected one of the plurality of FLC techniques to the previously-decoded audio signal to generate the output audio signal corresponding to the lost frame.

16. The computer program product of claim 15, wherein the first means includes means for enabling the processor to determine if the previously-decoded audio signal is speech or music.

17. The computer program product of claim 15, wherein the second means comprises means for enabling the processor to select an FLC technique designed for music.

18. The computer program product of claim 17, wherein the means for enabling the processor to select an FLC technique designed for music comprises means for enabling the processor to select a frame repeat FLC technique.

19. The computer program product of claim 15, wherein the second means comprises means for enabling the processor to select an FLC technique designed for speech.

20. The computer program product of claim 19, wherein the means for enabling the processor to select an FLC technique designed for speech comprises means for enabling the processor to select a periodic waveform extrapolation (PWE) based FLC technique.

* * * * *